United States Patent [19]

Howard

[11] Patent Number: 5,065,133

[45] Date of Patent: Nov. 12, 1991

[54] METHOD AND APPARATUS CONVERTING DIGITAL SIGNALS TO ANALOG SIGNALS AND SIMULTANEOUS TRANSMISSION OF AC POWER AND SIGNALS OVER WIRE CONDUCTORS

[75] Inventor: Gary Howard, Minneapolis, Minn.

[73] Assignee: The Siemon Company, Watertown, Conn.

[21] Appl. No.: 398,784

[22] Filed: Aug. 25, 1989

[51] Int. Cl.$^5$ .............................................. H04B 3/54
[52] U.S. Cl. .................................. 340/310 A; 375/17
[58] Field of Search .................... 375/35, 36, 17, 49; 370/44; 340/310 A, 310 R

[56] References Cited

U.S. PATENT DOCUMENTS

| | | | |
|---|---|---|---|
| 3,078,416 | 2/1963 | McAuliffe | 375/67 |
| 3,183,442 | 5/1965 | Filipowsky | 375/4 |
| 3,476,879 | 11/1969 | Zenner | 375/17 |
| 4,464,265 | 8/1964 | Shimizu | 375/36 |
| 4,514,594 | 4/1985 | Brown et al. | 340/310 R |
| 4,665,531 | 5/1987 | Aly | 375/17 |
| 4,714,912 | 12/1987 | Roberts et al. | 340/310 R |

OTHER PUBLICATIONS

"Waveforms, A Modern Guide to Nonsinusoidal Waves and Nonlinear Processes", by Homer B. Tilton, 1986, pp. 100–102.

"Recommended Conditions for the Use of Twisted Pair Telephone Wiring for In–House Data Communications", ADI Telecommunications, 12/1986, pp. 32–38.

Primary Examiner—Jin F. Ng
Assistant Examiner—Jill Jackson
Attorney, Agent, or Firm—Fishman, Dionne & Cantor

[57] ABSTRACT

A method and apparatus for enhancing digital signal transmission is provided for (1) converting a digital signal to an enhanced analog signal having a specified polarity and angular velocity; (2) transmitting that enhanced analog signal from one electronic component to another electronic component; and (3) converting the enhanced analog signal back to a reconstituted digital signal. The enhanced analog signal comprises a smooth non-periodic function of voltage, current and time which preferably has the waveform of a versine function signal with specified polarity. A method of supplying power to remote locations of the apparatus for enhancing digital signals is also presented.

27 Claims, 5 Drawing Sheets

METHOD AND APPARATUS CONVERTING DIGITAL SIGNALS TO ANALOG SIGNALS AND SIMULTANEOUS TRANSMISSION OF AC POWER AND SIGNALS OVER WIRE CONDUCTORS

BACKGROUND OF THE INVENTION

This invention relates to a method and device for enhancement of digital signal transmission. More particularly, this invention relates to a method of converting digital signals to analog signals having a specified angular velocity with respect to rate of change of voltage and current, and a specified polarity whereby the limits on length and data transfer rates for metallic transmission lines, such as unshielded twisted pair, may be substantially increased.

Digital telecommunication systems such as personal computer networks utilize signal transmission media which must meet rigorous requirements in terms of electromagnetic emissions (e.g.; FCC Part 15) and transmission capability (e.g., crosstalk, attneuation VSWR, etc. . . .) for a wide range of signals and end-to-end distances. Presently, transmission means such as coaxial cable, twinaxial cable, shielded twisted pair and fiber optic cable are typically used to digitally interconect electronic components in the network. Unshielded twisted pair, which offers advantages over other cable types in terms of cost, size of installed base, and ease of installation/maintenance, is utilized presently with severe limitations on distance and/or data transfer rates.

Presently used alternatives to the above noted transmission enhancement method that allow the use of unshielded twisted pair wiring with systems designed to operate with unbalanced or shielded media include: balun circuitry to enhance electromagnetic compatibility between cable types with dissimilar characteristic impedance levels and to isolate voltage reference levels between balanced and unbalanced media thereby eliminating ground loops; amplification circuitry to overcome limitations in dynamic range that may lead to unacceptable signal loss at the receiving end; filtration circuitry at the transmitting end to minimize electromagnetic emissions, and/or at the receiving end to reduce noise from external sources.

While these alternatives, used together or independently, offer economical solutions for providing signal transmission between telecommunication devices with unshielded twisted pair wire, they also suffer from several serious drawbacks that are overcome by this invention. For example, the use of baluns may allow signals, that radiate at an acceptable level over shielded media, to radiate beyond acceptable limits over unshielded twisted pair. Furthermore, the insertion loss and bandwith limitations of balun circuitry place restrictions on distance and data rates that are unacceptable for a broad range of applications. Amplification may overcome distance limitations to some extent on unshielded twisted pair data lines but is prone to generating increased electromagnetic emissions and, by itself, degrades signal to noise ratio. Filtering at the transmitting end to reduce out of band transmission is similar to the present invention in that high frequency Fourier components are attenuated, but is limited in that the filter bandwidth must be broad enough to pass digital pulses of varying duration. The design of such filters often requires that higher frequencies be transmitted with more power to overcome the greater noise and insertion loss associated with the wide bandwidth required by the system. Likewise, filtering circuitry at the receiving end must be of sufficient bandwidth to allow a wide range of pulse widths through to receiving circuitry without distortion or attenuation. Therefore, their ability to filter noise throughout that range is severely limited. These limitations are overcome by the present invention, which makes use of an analog signal of limited spectral content that permits transmission over unshielded twisted pair wire at very low power levels through matched impedance circuitry that is tuned to a specific angular velocity.

Economics suggest that, when active circuits, such as amplifiers, repeaters and other devices of the type described herein are used for signal transmission, the power required by remote circuitry be derived from the signal line in a "phantom power" approach. In prior art devices, phantom power is typically provided by an applied voltage on the secondary side of a signal output transformer. These methods include: the "green wire ground method" which imposes an AC or DC voltage on the line referenced from separate ground connections at both ends; various combinations of DC blocking capacitor methods which provide a DC voltage between separate signal carriers; and methods which tie AC or DC power to center tapped transformer elements connected directly to separate wire pairs. The prior art methods of transmitting power over signal carriers which employ a direct means of connecting power to the signal line are limited by the fact that output impedance of the power supply circuitry is not isolated from the signal, which is preferably controlled by the passive transformer elements alone. The present invention circumvents this problem by electromagnetically coupling AC power with the signal carriers. An inherent benefit of this design is the elimination of gound loops which give rise to electromagnetic interference in DC based phantom-power circuits.

SUMMARY OF THE INVENTION

The above-discussed and other problems and deficiencies of the prior art are overcome or alleviated by the method and apparatus for enhancing digital signal transmissions of the present invention. In accordance with the present invention, a method is provided for (1) converting a digital signal to an enhanced analog signal having a specified polarity and angular velocity; (2) transmitting that enhanced analog signal from one electronic component to another electronic component; and (3) converting the enhanced analog signal back to a reconstituted digital signal. The enhanced analog signal comprises a smooth non-periodic function of amplitude and time which preferably has the waveform of a versine function signal wherein one frequency component prevails.

Use of the non-periodic versine function as the fundamental signal in the transmission enhancement device of the present invention allows the digital signal, which is generally composed of a wide range of frequencies, to be converted to a waveform whose frequency content is concentrated at a single, fundamental value. By eliminating the broad range of frequency components, commonly referred to as harmonics or Fourier components, that are inherent to digital pulse signals, it is possible to operate with increased immunity to electrical noise, such as crosstalk and electromagnetic interference, decreased radiation to the environment and the minimization of wave shape distortion at the receiving end. Improvement to the transmitability of digital pulse signals greatly enhances the capability of metallic transmission media, especially those with limited dynamic range such as twisted pair wire, in terms of both allowable data transfer rates and end-to-end distance. In addition, the electromagnetic compatibility between the signal waveform and the transmission media are significantly improved such that the use of unshielded twisted pair wiring will be acceptable in applications where shielding was previously required to decrease electromagnetic radiation and increase noise immunity of the carrier.

While the present invention will be described as being used in conjunction with metallic transmission media, this invention may also be used as a method of signal transmission between antennas.

The present invention will thus provide for a communication system for electronic networks using cabling means such as unshielded twisted pair wire which will now provide a high degree of integrity and security at a much lower cost than is associated with current interconnect systems that are specialized for data transmission (e.g. coaxial cable, twinaxial cable, shielded twisted pair and fiber optics).

Also discussed is a novel method of supplying power to remote locations of the apparatus for enhancing digital signals of the present invention.

The above discussed and other features and advantages of the present invention will be appreciated and understood by those of ordinary skill in the art from the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

Figure 1:
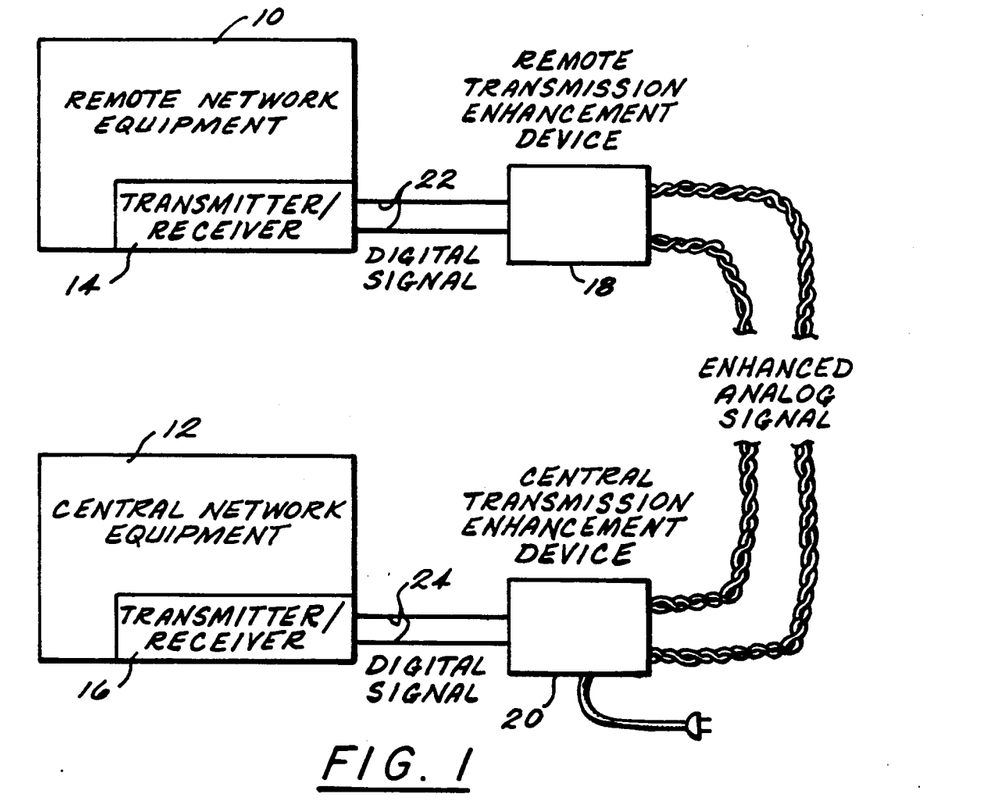
FIG. 1 is a schematic representation of a system of electronic components employing the transmission enhancement device of the present invention.

The present invention relates to a method and device for enhancing the digital signal transmitted between electronic components. Referring to FIG. 1, a schematic representation is shown of a pair of spaced, discrete electronic devices 10 and 12, which, for example only, comprise network equipment used for the processing and display of digital information. Each device includes a transmitter/receiver 14,16 for transmitting and receiving digital signals.

In accordance with the present invention, a transmission enhancement device 18,20 is associated with each transmitter/receiver 14,16 for converting the digital signal from the network equipment to an enhanced analog signal; and then reconverting the enhanced analog signal to the original digital signal. The digital signals will be carried between network equipment 10,12 to and from the transmission enhancement devices 18,20 on cords 22,24 made from digital transmission medias such as coaxial cable, twinaxial cable or shielded twisted pair cable. Significantly, the enhanced analog signal is transmitted throughout the telecommunications wiring system (between devices 18 and 20) on a far less expensive transmission medium such as the well known unshielded twisted pair wire used for telephone service.

The enhanced analog signal has a specified polarity and a specified angular velocity; and comprises a waveform generated from a smooth function of voltage, current and time. This function preferably comprises a non-periodic versine function.

The basic versine (V) definition is:

$$V = 1 - \cos(A) \tag{1}$$

where A is commonly a function of time. In accordance with the present invention, Equation (1) is adopted to the form:

$$V_t = K\left[1 - \cos\left(\frac{2\pi t}{\tau}\right)\right] \tag{2}$$

where "K" is the amplitude of the signal, "$\tau$" is the period of the full-cycle versine, and "$\tau$" is time. It will be appreciated that, for periodic wave forms, the frequency spectrum for Equation (2) is identical to a simple sine function of the form:

$$V_s = \sin\left(\frac{2\pi t}{\tau}\right) \tag{3}$$

Figure 2:
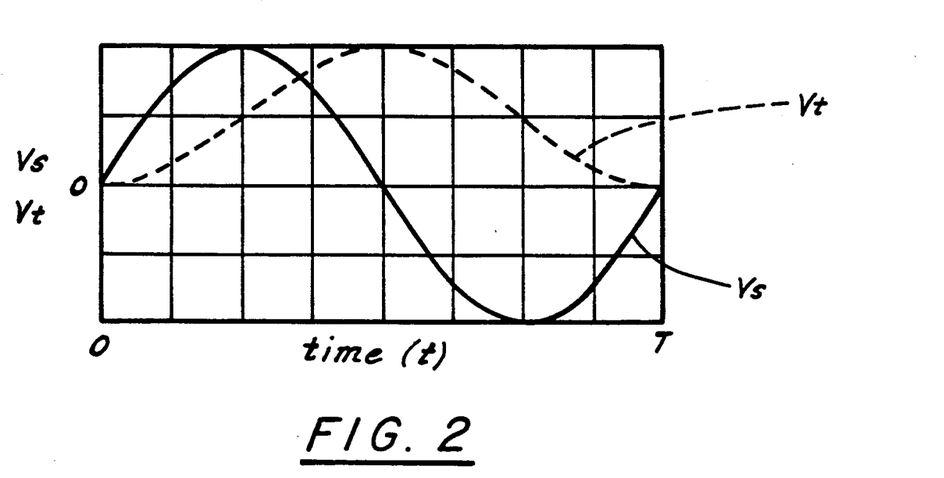
FIG. 2 is a graph of amplitude versus time for analog signal pulses having the respective waveforms of a sine ($V_s$) and a versine ($V_t$)

Referring to FIG. 2, the waveforms ($V_t$, $V_s$) generated on a graph of amplitude versus time is depicted for Equation (2) and Equation (3). Although these signals are the same in the frequency domain, one important distinction between them in the time domain is that, with Equation (3) polarity reversal occurs with each shift in phase of $\pi/\tau$. In contrast, Equation (2) will maintain positive (or negative) polarity regardless of any phase shifts that may occur between transmitter and receiver. The importance of this distinction lies in the fact that polarity may now be used by the transmission enhancement device to convey information about the digital signal that could not be effectively transmitted by the waveform of Equation (3) in the same bandwidth.

The fundamental signals preferably utilized in the transmission enhancement device of the present invention refines Equation (2) slightly to assign values to "K" of +1 and −1, and to limit the signal to a single cycle as characterized by the following:

$$V_p = 1 - \cos\left(\frac{2\pi t}{\tau}\right) \quad (4)$$

$$V_n = -\left[1 - \cos\left(\frac{2\pi t}{\tau}\right)\right] \quad (5)$$

where these functions are limited to the domain:

$$0 \leq t \leq \tau$$

$V_p$ is the enhanced analog signal triggered by the digital transition "low-to-high" and $V_n$ is the enhanced analog signal triggered by the digital transition "high-to-low".

Figure 3A:
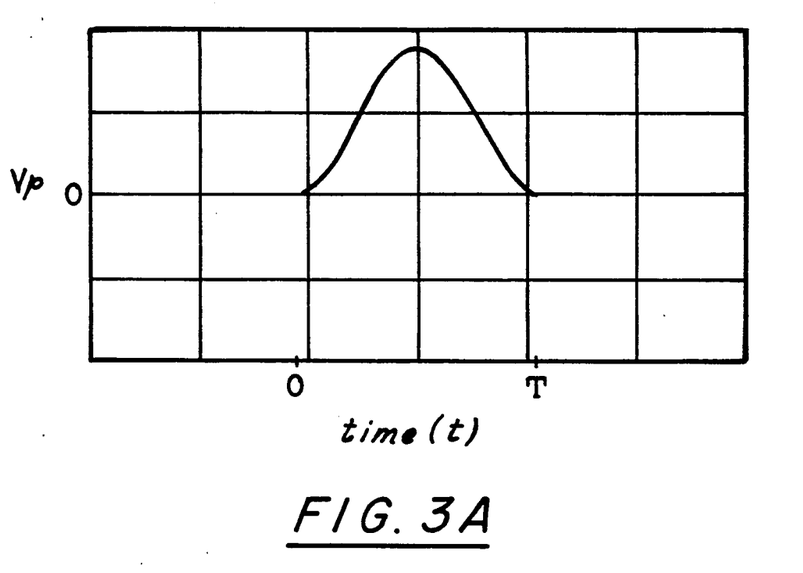
FIGS. 3A and 3B are graphs of amplitude versus time generated for analog signal pulses ($V_p$, $V_n$) having the waveform corresponding to low-to-high (FIG. 3A) and high-to-low (FIG. 3B) digital, transitions.
Figure 3B:
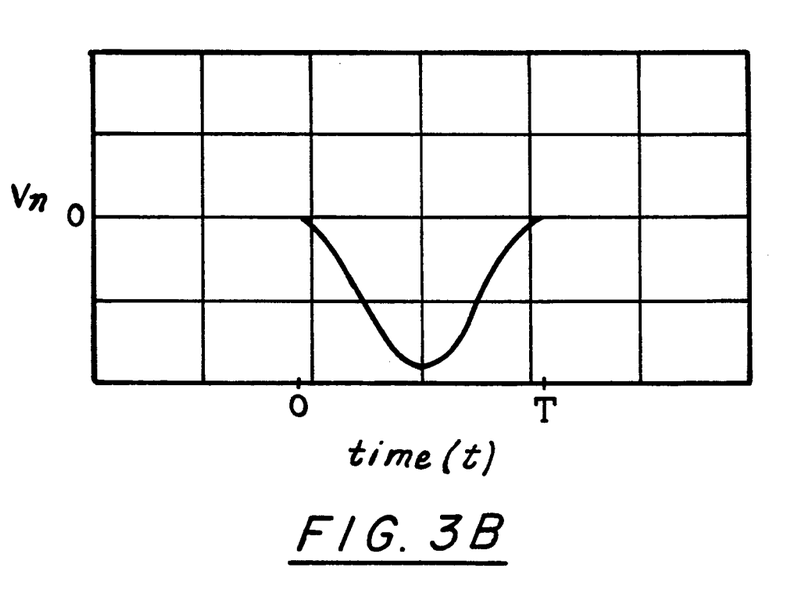

The waveforms generated by Equations 4 and 5 are depicted in FIGS. 3A and 3B, respectively; and are characterized as smooth, non-periodic pulse functions $V_p$ and $V_n$ that contain only one required frequency component. Note particularly that each versine waveform begins and ends at a rounded or flattened edge as opposed to the abrupt corners associated with the leading and trailing edges of broken sine wave pulses, such as the curve $V_s$ in FIG. 2, which give rise to high frequency Fourier components.

Figure 4A:
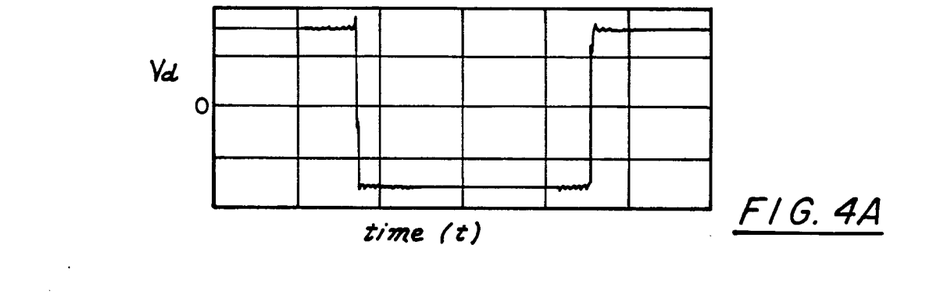
FIGS. 4A and 4B are graphs of amplitude versus time for a digital signal ($V_d$) and corresponding analog signal pulses $V_p$, $V_n$)
Figure 4B:
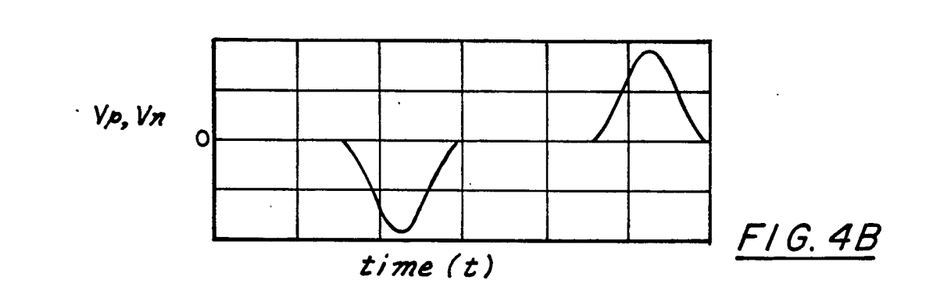

Turning now to FIGS. 4A and 4B, in accordance with the present invention, a typical digital signal $V_d$ is converted to the enhanced analog signals $V_p$, $V_n$ of Equations 4 and 5 such as shown by the curves on FIG. 4B. These conversions occur at the state changes of a typical digital pulse as is clear from a visual comparison between the curves shown along the same time scale. The resultant enhanced analog signal will have a specified angular velocity with respect to the rate of change of amplitude and a specified polarity. Angular velocity ($\omega$) is a function of frequency (f) as follows:

$$\omega = 2\pi F \quad (6)$$

Figure 4C:
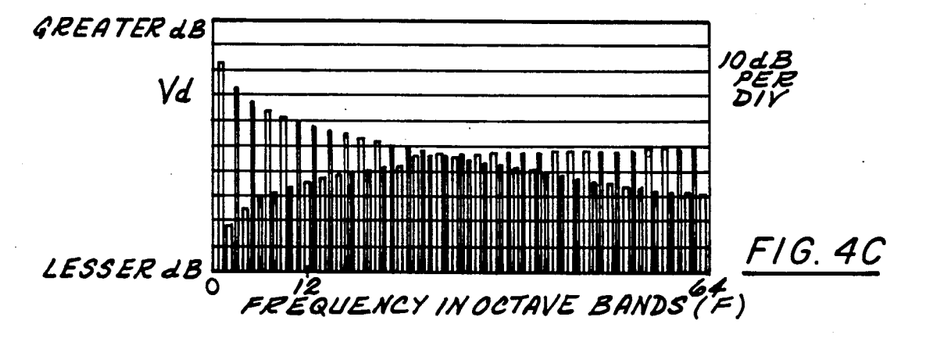
FIGS. 4C and 4D are graphs of power versus frequency depicting the corresponding digital and enhanced analog signal waveforms shown in FIGS. 4A and 4B, respectively.
Figure 4D:
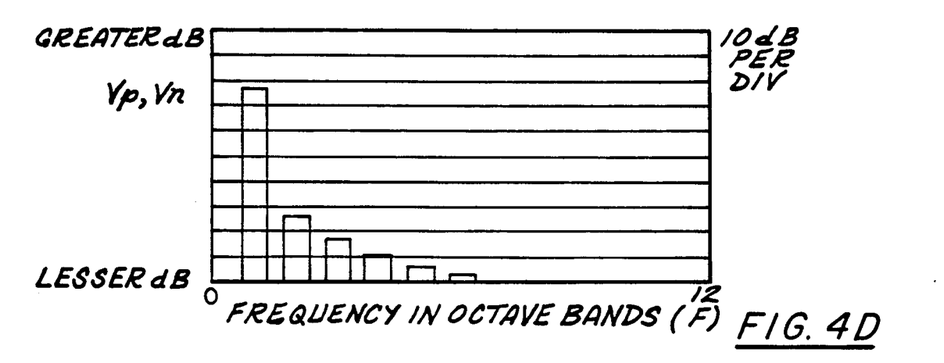

Thus, the resultant enhanced analog signal will be tuned to a specified frequency. FIGS. 4C and 4D illustrate the difference, in the frequency domain, between the typical digital pulse $V_d$ and that of the enhanced analog signals $V_p$, $V_n$. It will be appreciated that the transitions that characterize the digital signal are conveyed by the enhanced analog signal with greatly reduced bandwidth. This enhancement allows appropriate circuitry (discussed with reference to FIGS. 5–7) to tune out all signals being received or transmitted except for the signals having the specified angular velocity (or frequency) and specified polarity. In other words, the present invention will tune into a selected frequency by tuning out all other signals.

The maximum rate of digital state changes is equal to the tuning frequency utilized in the transmitting and receiving circuitry of the transmission enhancement device. For example, a circuit tuned to transmit a smooth non-periodic function with an angular velocity of 40 $\pi$ Mrad/sec would be capable of transmitting 20 million digital state per second.

Figure 5:
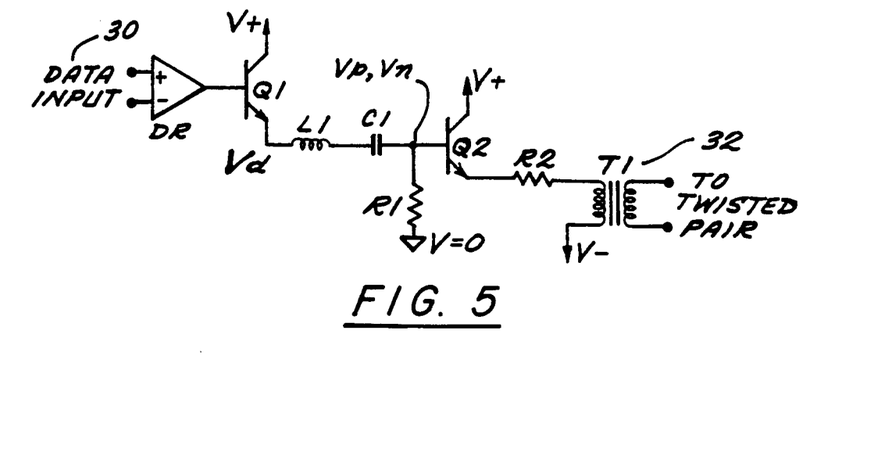
FIG. 5 is an electronic schematic of a transmitting circuit in accordance with the present invention.
Figure 6:
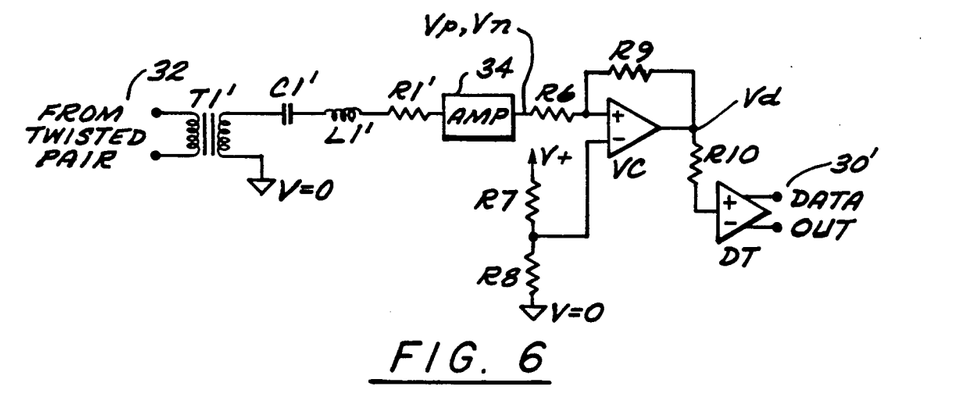
FIG. 6 is an electronic schematic of a receiving circuit in accordance with the present invention.

The waveforms of the smooth non-periodic function described above may be created, transmitted and received in many ways. FIG. 5 is an example of a transmitting circuit for converting digital data input signals into an enhanced analog signal in accordance with the present invention. FIG. 6 is an example of a receiving circuit for receiving the enhanced analog signal transmitted from the circuit of FIG. 5 and converting said enhanced analog signal back to the original digital data input signal. The circuits of FIGS. 5 and 6 would be housed within the transmission enhancement devices 18 and 20 of FIG. 1. Alternatively, these circuits could be made integral within network equipment (e.g. personal computer) identified at 10 and 12 in FIG. 1. Preferably, each transmission enhancement device 18 and 20 includes both a receiving circuit and a transmitting circuit so that data can be both transmitted and received from a given electronic component. Of course, if the electronic component is only meant to receive data (such as a printer or the like), then only a circuit such as FIG. 6 would be required in the enhancer device associated with that electronic component. Similarly, if the electronic component was only meant to transmit data, then only a transmitting circuit such as shown in FIG. 5 would be needed for the signal enhancing device used with that electronic component.

Turning specifically now to FIG. 5 and Table 1 which identifies the several electronic components and their values, the preferred transmitting circuit receives data from conventional digital data transmission medium 30 (such as coaxial cable, twinaxial cable or shielded twisted pair). The digital data signal (baseband data) from such transmission medium 30 is input to a differential receiver DR which acts to give the digital signal sharp, fast transition times. The impedance of the digital signal output is then dropped by a transistor Q1 preferably operating in Class A, emitter-follower mode. At this point in the circuit, the signal is still a digital signal as identified by $V_d$ corresponding to FIG. 4A. The signal then encounters an inductor L and capacitor C connected in series. The inductor L and capacitor C are tuned for resonance at the frequency of, for example, 20 MHz. Following capacitor C is a resistor R1 which connects to DC bias at 0 (reference) volts and to transistor Q2 preferably in operating Class A, emitter follower mode. The combination of the inductor, capacitor and resistor act to transform the digital signal to an enhanced analog signal identified as $V_p$ or $V_n$ corresponding to FIG. 4B. The transistor Q2 emitter is DC biased to a negative voltage source through a resistor R2 and transformer T1, which establishes the transmitter output impedance, at the primary of transformer T1. The enhanced analog signal is then inductively coupled to an unshielded twisted pair wire 32 and transmitted to another electronic component having a receiving circuit such as shown at FIG. 6 associated therewith. The enhanced analog signal transmitted on twisted pair wire 32 will have an output waveform which is a smooth non-periodic function (e.g. single cycle versine function) as described above in conjunction with FIGS. 4B and 4D and equations 4 and 5.

TABLE 1

| | |
|---|---|
| DR: | differential receiver, National Semicon, DS8921AN |
| Q1, Q2: | transistor, Motorola, BF959 |
| T1: | transformer, 100 Ohms at 20 MHz |

TABLE 1-continued

| L1: | inductor, 800 nH |
| --- | --- |
| C1: | capacitor, 80 pF |
| R1: | Resistor, 1K Ohms |
| R2: | Resistor, 100 Ohms |

Turning to the receiving circuit of FIG. 6 and Table 2 which identifies the several electronic components and their values, the smooth non-periodic analog signal is inductively coupled from the twisted pair wire 32 into the circuit via a transformer T1'. The signal is then transmitted through a capacitor C1' and inductor L1' and resistor R1' connected in series and resistor R1' connected in parallel. C1' and L1' are tuned to the equivalent frequency of the enchanced analog signal, 20 MHz for the example described with regard to FIG. 5. R1 broadens the bandwidth of the tuning and raises the impedance seen looking into the receiver. The signal is then amplified and transmitted to resistor R6. Resistor R6 couples the voltage amplified, tuned versine pulse into the voltage comparator VC. Hysteresis (or positive feedback) is established via resistor R9, with the reference voltage established by R7/R8 voltage division. Change of state occurs when the versine pulses overdrive the hysteresis circuit composed of elements VC, R7, R4 and R9. At this point, the enhanced analog versine signals $V_p$, $V_n$ of FIG. 4B have been converted back to the digital signal $V_d$ of FIG. 4A. Next, resistor R10 drives the differential transmitter DT with baseband data whereupon the digital signal is transmitted on conventional digital data transmission medium 30 to network equipment as shown in FIG. 1.

Figure 7:
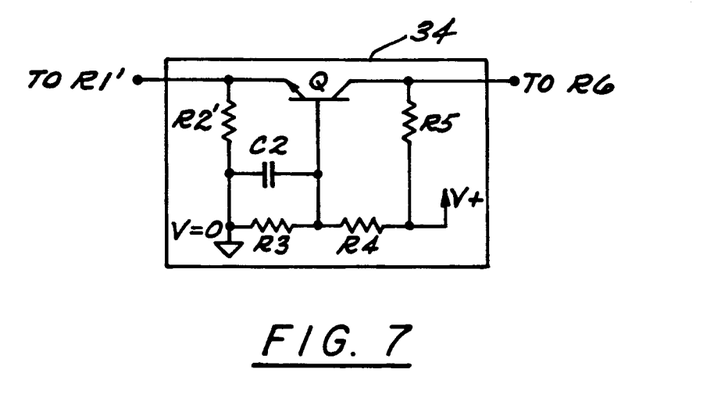
FIG. 7 is an electronic schematic of an amplifier used in the circuit of FIG. 6.

As shown in FIG. 7, amplifier 34 includes a resistor R2 which adds to the termination, and provides the DC path of the emitter. A transistor Q is preferably set up for Class A, common base mode operation via capacitor C2 and the R3/R4 voltage divider. R5 provides the high impedance Dc bias to the positive voltage.

TABLE 2

| VC: | voltage comparator, Linear Technology, Milpitas CA, LT1016CN |
| --- | --- |
| DT: | differential transmitter, National Semicon, DS8921AN |
| Q: | transistor, Motorola, BF959 |
| T1': | transformer, 100 Ohms, at 20 MHz |
| L1' | inductor, 800 nH |
| C1': | capacitor, 80 pF |
| C2: | capacitor, 8 pF |
| R1': | Resistor, 100 Ohms |
| R2': | Resistor, 100 Ohms |
| R3: | Resistor, 2.2k Ohms |
| R4: | Resistor, 2.2k Ohms |
| R5: | Resistor, 1k Ohms |
| R6: | Resistor, 1k Ohms |
| R7: | Resistor, 1k Ohm |
| R8: | Resistor, 100 Ohms |
| R9: | Resistor, 10k Ohms |
| R10; | Resistor, 10k Ohms |

While the present invention has been described, by example only, for use with unshielded twisted pair wire, this invention may also be utilized with other forms of wire transmission media or non-media (e.g., antennas).

The method and apparatus of the present invention allows the use of unshielded twisted pair wire as a transmission medium for digital signals. By using the tuned versine pulse described in detail above, the transmission capability of metallic transmission media such as unshielded twisted pair wire is substantially increased in terms of both data transfer rates and end-to-end distance. In addition, the undesirable effects of electromagnetic radiation will be substantially reduced. By tuning the pulse with specific timing information, frequency information and polarity information, signal transmission can be accomplished over very narrow bandwidths and with substantial isolation from induced noise such as cross-talk and electromagnetic interference.

In one particular advantageous feature of the present invention, the digital signals can be tuned such that at each transmission enhancement device, transmitted signals will be tuned at a first preselected frequency, and receiving signals will be tuned at a second preselected frequency. Using two distinct frequencies (e.g. one frequency for transmitting and a different frequency for receiving) on the twisted pair wire will effectively remove cross-talk between wire pairs. This is in distinct contrast to conventional use of twisted pair wires wherein the wide frequency range often leads to undesirable cross-talk. Variations on the multi-frequency approach may also be used to allow for transmitting and receiving on the same wire pair or for multiplexing a variety of digital signals or AC power on a single transmission line.

While each signal enhancement device 18 and 20 of FIG. 1 may be individually powered, it may be preferable, in some applications such as those where multiple network devices are served by a central processor or access unit, to transmit power from one signal enhancement device to another. Power transmission to remote transmission enhancement devices from those at a central location such as an equipment room (where power is most readily available and can be most easily connected) allows the remote transmission devices to be installed in office or factory work areas without regard to the availability of AC power and without the congestion caused by power cords that may be easily dislodged. The problem of providing power to remote signal enhancement devices is solved, on the present invention, by a unique application of electromagnetic theory. Because DC power promotes ground loops which increase the line's susceptibility to noise; and because the minimization of noise is an objective on any signal carrying medium, it will be appreciated that AC is the preferred method of power transmission. An additional problem, caused by typical Prior art DC power transmission, which is also overcome here, is poor impedance control, which, for high transmission rates is critical to signal integrity.

Figure 8:
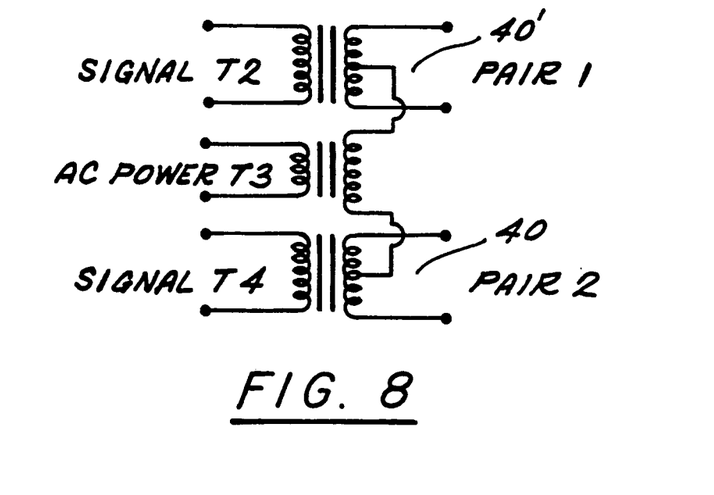
FIG. 8 is an electronic schematic of a first embodiment of a power transmission circuit for use in the present invention.

Referring now to FIG. 8, in a preferred embodiment, and when using two pairs of twisted pair wire, power is AC coupled at some preselected frequency using transformer center taps (40,40'). This configuration allows AC power, introduced at T3, to drive the center taps differentially. Because power is only available between the center taps it can be common mode coupled onto each pair. This technique minimizes the differential powers appearing as noise between conductors of, for example, a twisted pair, while providing differential power between pairs. At the receiving end, the AC power signal may be decoupled and rectified as required by the application. A similar approach to that shown in FIG. 8 has been utilized for transmitting three phone voice lines over two pairs. However, this prior approach did not suggest provisions for transmitting remote power.

Frequencies much greater than the typical 60 Hertz are preferably utilized from the power source, thereby keeping rectification components small. A 100 KHz sine wave provides an example of an optimized power frequency.

Figure 9:
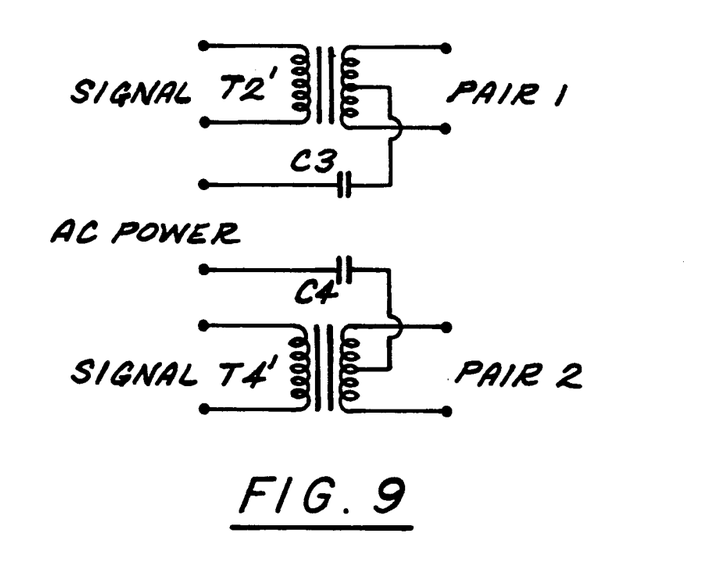
FIG. 9 is an electronic schematic of an alternate embodiment of a power transmission circuit for use in the present invention.

A less preferred embodiment for providing AC coupling of power is depicted in FIG. 9. In FIG. 9, transformer T3 is replaced by two series capacitors C3 and C4 which effectively allow the power to be capacitively coupled to the center taps of the signal transformers T2' and T4' so as to define a capacitive transformer. In all other respects, the AC power signal would be transmitted as with the FIG. 8 embodiment. While the preferred and alternate embodiments shown here are for applications calling for two wire pairs, it will be appreciated that the application of this power transmission method is, by no means, limited to two pair transmission line applications or to circuitry of the two embodiments illustrated in FIGS. 8 and 9.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method of enhancing digital signal transmission over at least two pairs of twisted pair wire conductors defining a transmitting pair and a receiving pair, comprising the steps of:
   (1) converting a digital signal to an analog signal having a specified angular velocity and a specified polarity to define an enhanced analog signal comprising a waveform generated from a smooth function of voltage, current and time;
   (2) transmitting said enhanced analog signal over said transmitting pair with said enhanced analog signal being received by said receiving pair;
   (3) tuning said enhanced analog signal on said transmitting pair to a first angular velocity;
   (4) tuning said enhanced analog signal on said receiving pair to a second angular velocity; and
   (5) reconverting said enhanced analog signal back to said digital signal.

2. The method of claim 1 including:
converting said digital signal to said enhanced analog signal at each state transition of said digital signal.

3. The method of claim 1 wherein:
said smooth function comprises a selected function wherein one selected frequency component prevails.

4. The method of claim 1 wherein:
said smooth function comprises a non-periodic versine function.

5. The method of claim 4 including:
converting said digital signal to said enhanced analog signal at each state transition of said digital signal.

6. The method of claim 5 wherein said versine function is characterized by the following equations for low-to-high digital state transitions ($V_p$) and for high-to-low digital state transitions ($V_n$):

$$V_p = 1 - \cos\left(\frac{2\pi t}{\tau}\right)$$

$$V_n = -\left[1 - \cos\left(\frac{2\pi t}{\tau}\right)\right]$$

where
$\tau$ = the period of the full-cycle versine;
$t$ = time; and
$t$ is limited to the domain;
$0 \leq t \leq \tau$.

7. A method of enhancing digital signal transmission comprising the steps of:
   (1) converting a digital signal to an analog signal having a specified angular velocity and a specified polarity to define an enhanced analog signal comprising a waveform generated from a smooth function of voltage, current and time;
   (2) transmitting said enhanced analog signal on at least one pair of unshielded twisted pair wire conductors;
   (3) coupling AC power at a selected frequency onto said at least one pair of twisted pair wire conductors; and
   (4) reconverting said enhanced analog signal back to said digital signal.

8. A method of enhancing digital signal transmission over at least two pairs of twisted pair wire conductors defining a transmitting pair and a receiving pair, comprising the steps of:
   (1) converting a digital signal to an analog signal having a specified angular velocity and a specified polarity to define an enhanced analog signal comprising a waveform generated from a smooth function of voltage, current and time;
   (2) transmitting said enhanced analog signal over said transmitting pair with said enhanced analog signal being received by said receiving pair;
   (3) coupling AC power at a selected frequency onto each pair of said at least two pairs of twisted pair wire conductors; and
   (4) reconverting said enhanced analog signal back to said digital signal.

9. The method of claim 8 wherein each of said pairs of twisted pair wire conductors is associated with a transformer and wherein said step of coupling AC power includes:
using transformer center tap means driven differentially to common mode couple the AC power onto each transformer associated with each pair of said at least two pairs of twisted pair wire conductors.

10. The method of claim 8 wherein each of said pairs of twisted pair wire conductors is associated with a transformer and wherein said step of coupling AC power includes:
using series capacitor means to capacitively couple the AC power onto each transformer associated with each of said at least two pairs of twisted pair wire conductors.

11. A device for enhancing digital signal transmission over at least two pairs of twisted pair wire conductors defining a transmitting pair and a receiving pair, comprising:
   (1) first converting means for converting a digital signal to an analog signal having a specified angular velocity and a specified polarity to define an enhanced analog signal comprising a waveform generated from a smooth function of voltage, current and time;
   (2) transmitting means for transmitting said enhanced analog signal over said transmitting pair with said enhanced analog signal being received by said receiving pair;
   (3) first tuning means for tuning said enhanced analog signal on said transmitting pair to a first angular velocity; and (4) second tuning means for tuning said enhanced analog signal on said receiving pair to a second angular velocity; and (5) second converting means for reconverting said enhanced analog signal back to said digital signal.

12. The device of claim 11 wherein:
said first converting means includes means for converting said digital signal to said enhanced analog signal at each state transition of said digital signal.

13. The device of claim 11 wherein:
said smooth function comprises a selected function wherein one selected frequency component prevails.

14. The device of claim 11 wherein said first converting means comprises:
differential receiver means for receiving digital signal input;
first transistor means connected to said differential receiver means;
first inductor means connected to said first transistor means;
first capacitor means connected to said inductor means, said first inductor means and said first capacitor means being tuned for resonance at said specified angular velocity;
first resistor means connected to said first capacitor means;
second transistor means connected to said first resistor means;
second resistor means connected to said second transistor means; and
transformer means connected to said second resistor, said transformer means coupling said enhanced analog signal to said at least two pairs of twisted pair wire conductors.

15. The device of claim 11 wherein said second converting means comprises:
transformer means for coupling said enhanced analog signal from said at least two pairs of twisted pair wire conductors;
first capacitor means connected to said transformer means;
first inductor means connected to said first capacitor means;
first resistor means connected to said first inductor means;
amplifier means connected to said first resistor means;
second resistor means connected to said amplifier means;
voltage comparator means connected to said second resistor means;
means for establishing hysteresis associated with said voltage comparator means and changing said enhanced analog signal to a digital signal;
third resistor means connected to said voltage comparator means; and
differential transmitter means connected to said third resistor means for transmitting the digital signal.

16. The device of claim 15 wherein said amplifier means comprises:
transistor means connected between said first and second resistor means;
fourth resistor means connected between said transistor means and said first resistor means;
fifth resistor means connected between said transistor means and said second resistor means;
voltage divider means connected between said fourth and fifth resistor means; and
second capacitor means connected between said fourth resistor means and said voltage divider means.

17. The device of claim 11 wherein:
said smooth function comprises a non-periodic versine function.

18. The device of claim 17 wherein:
said first converting means includes means for converting said digital signal to said enhanced analog signal at each state transition of said digital signal.

19. The device of claim 18 wherein said versine function is characterized by the following equations for low-to-high digital state transitions ($V_p$) and for high-to-low digital state transitions ($V_n$):

$$V_p = 1 - \cos\left(\frac{2\pi t}{\tau}\right)$$

$$V_n = -\left[1 - \cos\left(\frac{2\pi t}{\tau}\right)\right]$$

where
$\tau$ = the period of the full-cycle versine;
t = time; and
t is limited to the domain;
$0 \leq t \leq \tau$.

20. A device for enhancing digital signal transmissions comprising:
(1) first converting means for converting a digital signal to an analog signal having a specified angular velocity and a specified polarity to define an enhanced analog signal comprising a waveform generated from a smooth function of voltage, current and time;
(2) transmitting means for transmitting said enhanced analog signal on at least one pair of unshielded twisted pair wire conductors;
(3) means for coupling AC power at a selected frequency onto said at least one pair of twisted pair wire conductors; and
(4) second converting means for reconverting said enhanced analog signal back to said digital signal.

21. A device for enhancing digital signal transmission over at least two pairs of twisted pair wire conductors defining a transmitting pair and a receiving pair, comprising:
(1) first converting means for converting a digital signal to an analog signal having a specified angular velocity and a specified polarity to define an enhanced analog signal comprising a waveform generated from a smooth function of voltage, current and time;
(2) transmitting means for transmitting said enhanced analog signal over said transmitting pair with said enhanced analog signal being received by said receiving pair;
(3) means for coupling AC power at a selected frequency onto each pair of said at least two pairs of twisted pair wire conductors; and
(4) second converting means for reconverting said enhanced analog signal back to said digital signal.

22. The device of claim 21 wherein each of said pairs of twisted pair wire conductors is associated with a transformer and wherein said coupling means includes:
center tap transformer means driven differentially to common mode couple the AC power onto each transformer associated with each pair of said at least two pairs of twisted pair wire conductors.

23. The device of claim 21 wherein each of said pairs of twisted pair wire conductors is associated with a transformer and wherein said coupling means includes:
series capacitor means to capacitively couple AC power onto each transformer associated with each of said at least two pairs of twisted pair wire conductors.

24. A method for transmitting AC power over wire conductors to remote electronic devices simultaneously with the transmission of signals over the same wire conductors comprising the step of:
coupling AC power at a selected frequency onto the wire conductors;
wherein the wire conductors include at least two pairs of twisted pair wire conductors and wherein each of said pairs of twisted pair wire conductors is associated with a transformer and wherein said step of coupling AC power includes;
using transformer center tap means driven differentially to common mode couple the AC power onto each transformer associated with each pair of said at least two pairs of twisted pair wire conductors.

25. A method for transmitting AC power over wire conductors to remote electronic devices simultaneously with the transmission of signals over the same wire conductors comprising the step of:
coupling AC power at a selected frequency onto the wire conductors;
wherein the wire conductors include at least two pairs of twisted pair wire conductors and wherein each of said pairs of twisted pair wire conductors is associated with a transformer and wherein said step of coupling AC power includes;
using series capacitor means to capacitively couple the AC power onto each transformer associated with each of said at least two pairs of twisted pair wire conductors.

26. A device for transmitting AC power over wire conductors to remote electronic devices simultaneously with the transmission of signals over the same wire conductors comprising:
coupling means for coupling AC power at a selected frequency onto the wire conductors;
wherein the wire conductors include at least two pairs of twisted pair wire conductors and wherein each of said pairs of twisted pair wire conductors is associated with a transformer and wherein said coupling means includes;
center tap transformer means driven differentially to common mode couple the AC power onto each transformer associated with each pair of said at least two pairs of twisted pair wire conductors.

27. A device for transmitting AC power over wire conductors to remote electronic devices simultaneously with the transmission of signals over the same wire conductors comprising:
coupling means for coupling AC power at a selected frequency onto the wire conductors;
wherein the wire conductors include at least two pairs of twisted pair wire conductors and wherein each of said pairs of twisted pair wire conductors is associated with a transformer and wherein said coupling means includes;
series capacitor means to capacitively couple AC power onto each transformer associated with each of said at least two pairs of twisted pair wire conductors.

* * * * *

UNITED STATES PATENT AND TRADEMARK OFFICE
CERTIFICATE OF CORRECTION

PATENT NO. : 5,065,133

DATED : 12 NOVEMBER 1991

INVENTOR(S) : Gary Howard

It is certified that error appears in the above-identified patent and that said Letters Patent is hereby corrected as shown below:

TITLE PAGE:

In the Abstract, line 2, change "transmission" to --transmissions--.

Column 1, lines 53-54, change "bandwith" to --bandwidth--.

Column 3, line 48, between "digital" and "transitions", delete --,--.

Column 3, line 51, add --(-- before "Vp".

Column 4, line 48, "T" should be --t--.

Column 5, line 48, change "F" to --f--.

Column 7, line 15, change "enchanced" to --enhanced--.

Column 7, line 39, change "Dc" to --DC--.

Column 7, line 53, change "Ohm" to --Ohms--.

Column 7, line 60, change "non-media" to --non-wire media--.

Column 8, line 45, change "Prior" to --prior--.

Column 11, line 34, delete "said".

Column 12, lines 28-29, change "transmissions" to --transmission--.

Signed and Sealed this

Thirteenth Day of April, 1993

*Attest:*

STEPHEN G. KUNIN

*Attesting Officer*    *Acting Commissioner of Patents and Trademarks*